United States Patent
Petel

(10) Patent No.: US 10,187,793 B2
(45) Date of Patent: Jan. 22, 2019

(54) METHOD FOR PAIRING A MOBILE TELEPHONE WITH A MOTOR VEHICLE AND LOCKING/UNLOCKING SET

(75) Inventor: Laurent Petel, Creteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 0 days.

(21) Appl. No.: 13/876,571

(22) PCT Filed: Sep. 28, 2011

(86) PCT No.: PCT/EP2011/066824
§ 371 (c)(1),
(2), (4) Date: Jun. 3, 2013

(87) PCT Pub. No.: WO2012/041885
PCT Pub. Date: Apr. 5, 2012

(65) Prior Publication Data
US 2013/0259232 A1     Oct. 3, 2013

(30) Foreign Application Priority Data

Sep. 28, 2010 (FR) .................... 10 03839

(51) Int. Cl.
*H04W 12/06* (2009.01)
*H04L 29/06* (2006.01)
*G07C 9/00* (2006.01)

(52) U.S. Cl.
CPC ........ *H04W 12/06* (2013.01); *G07C 9/00857* (2013.01); *H04L 63/0492* (2013.01);
(Continued)

(58) Field of Classification Search
CPC ..... H04W 12/02; H04W 12/06; H04W 12/04; H04L 63/0428; H04L 9/08; G07C 9/00309; G07C 9/00857; G07C 2009/00888
(Continued)

(56) References Cited

U.S. PATENT DOCUMENTS 6,674,860 B1 * 1/2004 Pirila .................... G01S 5/0045
380/247
6,970,703 B2 * 11/2005 Fuchs .................... G07C 5/008
340/901

(Continued)

FOREIGN PATENT DOCUMENTS

CN    101 319 586 A    12/2008
CN    101 527 061 A    9/2009
(Continued)

OTHER PUBLICATIONS

International Search Report issued in PCT/EP2011/066824 dated Dec. 14, 2011 (6 pages).
(Continued)

*Primary Examiner* — Farid Homayounmehr
*Assistant Examiner* — Sanchit K Sarker
(74) *Attorney, Agent, or Firm* — Osha Liang LLP

(57) ABSTRACT

The invention relates to a method for pairing a mobile telephone with a motor vehicle, said paired mobile telephone being used to lock/unlock and/or start said motor vehicle by means of at least part of an authentication code. Said method is characterized in that the mobile telephone (5) is loaded with said at least part of the authentication code required to be able to lock/unlock and/or start said motor vehicle.

16 Claims, 2 Drawing Sheets

Figure 1:
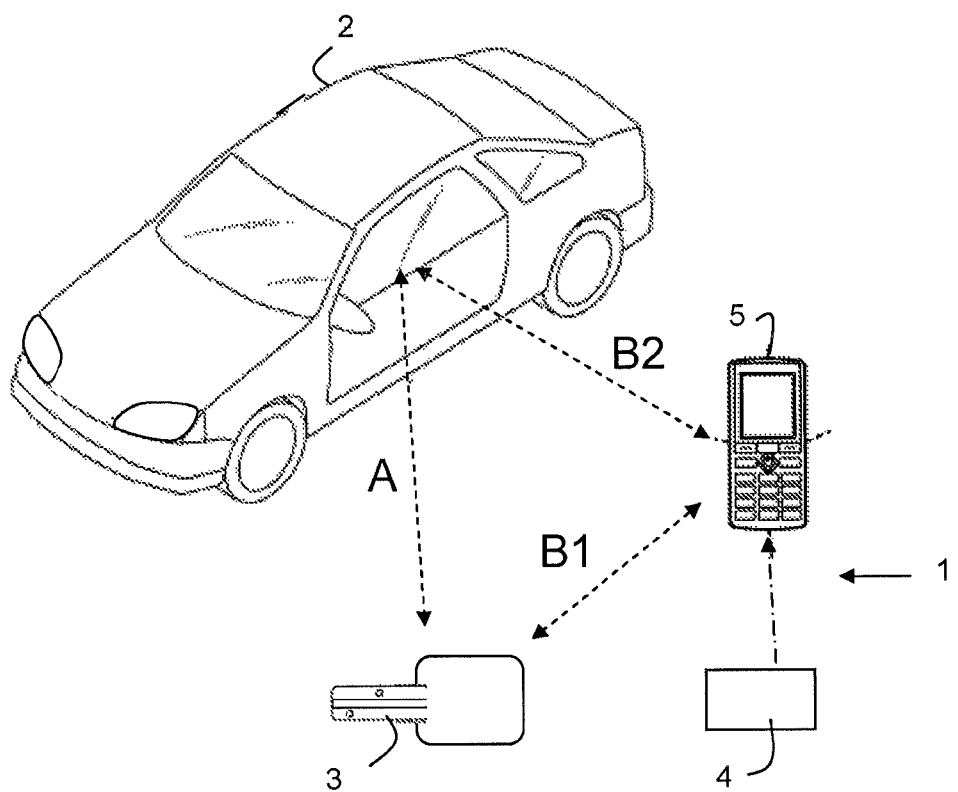

(52) U.S. Cl.
CPC .......... *H04L 63/18* (2013.01); *G07C 9/00309* (2013.01); *G07C 2009/00865* (2013.01); *G07C 2009/00888* (2013.01)

(58) Field of Classification Search
USPC ........................................................ 380/270
See application file for complete search history.

(56) References Cited

U.S. PATENT DOCUMENTS

| | | | | |
|---|---|---|---|---|
| 7,228,122 | B2* | 6/2007 | Oyagi | B60R 25/04 |
| | | | | 455/411 |
| 7,630,496 | B2* | 12/2009 | Liimatainen | H04L 9/083 |
| | | | | 380/258 |
| 7,650,509 | B1 | 1/2010 | Dunning | |
| 7,821,383 | B2* | 10/2010 | Sultan | G07C 9/00309 |
| | | | | 340/425.5 |
| 8,782,394 | B2* | 7/2014 | O'Neil | H04L 63/083 |
| | | | | 380/270 |
| 2002/0063472 | A1* | 5/2002 | Irvin | B60R 25/2009 |
| | | | | 307/10.1 |
| 2002/0080958 | A1* | 6/2002 | Ober | G06F 8/60 |
| | | | | 380/44 |
| 2006/0006983 | A1* | 1/2006 | Inoue | G07C 9/00309 |
| | | | | 340/5.61 |
| 2006/0081023 | A1* | 4/2006 | Tanimoto | B60R 25/02105 |
| | | | | 70/186 |
| 2006/0255908 | A1* | 11/2006 | Gilbert | B60R 25/24 |
| | | | | 340/5.61 |
| 2006/0283937 | A1* | 12/2006 | Daniel | G06F 21/31 |
| | | | | 235/382 |
| 2007/0200671 | A1* | 8/2007 | Kelley | B60R 25/257 |
| | | | | 340/5.72 |
| 2008/0034422 | A1 | 2/2008 | Al-Azzawi | |
| 2008/0061931 | A1* | 3/2008 | Hermann | B60R 25/24 |
| | | | | 340/5.72 |
| 2008/0157919 | A1* | 7/2008 | Sugiura | B60R 25/24 |
| | | | | 340/5.61 |
| 2008/0169898 | A1* | 7/2008 | Kato | B60R 25/2072 |
| | | | | 340/5.1 |
| 2009/0008441 | A1* | 1/2009 | Montgomery | G06Q 20/346 |
| | | | | 235/379 |
| 2009/0096596 | A1* | 4/2009 | Sultan | G07C 5/008 |
| | | | | 340/426.13 |
| 2009/0184800 | A1* | 7/2009 | Harris | G08C 17/00 |
| | | | | 340/5.21 |
| 2009/0195370 | A1* | 8/2009 | Huffman | B60R 25/04 |
| | | | | 340/426.13 |
| 2009/0224899 | A1* | 9/2009 | Wieser | B60C 23/0433 |
| | | | | 340/444 |
| 2010/0024019 | A1* | 1/2010 | Backlund | G06F 21/335 |
| | | | | 726/7 |
| 2010/0057624 | A1* | 3/2010 | Hurt | G06Q 20/20 |
| | | | | 705/76 |
| 2010/0097178 | A1* | 4/2010 | Pisz | B60R 16/037 |
| | | | | 340/5.72 |
| 2010/0239093 | A1* | 9/2010 | Hotta | G06F 21/35 |
| | | | | 380/270 |
| 2010/0328320 | A1* | 12/2010 | Kerstna | A61N 1/37282 |
| | | | | 345/501 |
| 2011/0276802 | A1* | 11/2011 | Roberts | H04L 63/0492 |
| | | | | 713/171 |
| 2012/0319951 | A1* | 12/2012 | Lee | G06F 1/169 |
| | | | | 345/161 |
| 2013/0099892 | A1* | 4/2013 | Tucker | G07C 9/00309 |
| | | | | 340/5.61 |
| 2013/0162421 | A1* | 6/2013 | Inaguma | H04B 5/0031 |
| | | | | 340/438 |
| 2013/0259232 | A1* | 10/2013 | Petel | H04L 63/0492 |
| | | | | 380/270 |

FOREIGN PATENT DOCUMENTS

| | | |
|---|---|---|
| FR | 2942755 A1 | 9/2010 |
| KR | 10 2005 0022929 A | 3/2005 |
| WO | 2012017217 A1 | 2/2012 |
| WO | 2012022637 A1 | 2/2012 |

OTHER PUBLICATIONS

Communication from the Examining Division and Annex to the Communication issued in corresponding European Patent Application No. 11766945.7, dated Mar. 20, 2017 (15 pages).

* cited by examiner

METHOD FOR PAIRING A MOBILE TELEPHONE WITH A MOTOR VEHICLE AND LOCKING/UNLOCKING SET

The invention relates to a method for pairing a mobile telephone with a motor vehicle, and in particular a mobile telephone used to lock/unlock it and/or start it without touching the motor vehicle. The invention also relates to a motor vehicle starting and/or locking/unlocking set and a pairing application that can be downloaded to a mobile telephone.

A new category of keys is gradually appearing on the market. These keys are based on detection of the key by the vehicle as the user approaches it. A processor uses a transmitter placed inside the vehicle to communicate with the key near to the vehicle. If the processor determines that the key present is indeed the key with which it is associated, it unlocks the doors of the vehicle. The user can then access the passenger compartment of the vehicle. The processor also enables the engine to be started by pressing a start button. When the user leaves the vehicle with the key, the processor is able to detect the key moving away and lock the doors.

The communication between the key and the vehicle can be implemented using the near field communication (NFC) protocol. NFC enables short-range wireless links of around a few centimeters. This communication involves a deliberate action by the user and cannot therefore normally be used without the user knowing, thereby providing a guarantee of security.

This type of contactless means for locking/unlocking and/or starting the vehicle is currently being developed while guaranteeing the security of the communication, in particular with regard to potential hacking attempts.

For this purpose, the invention relates to a method for pairing a mobile telephone with a motor vehicle, said paired mobile telephone being used to lock/unlock and/or start said motor vehicle by means of at least part of an authentication code, characterized in that the mobile telephone is loaded with said at least part of the authentication code required to lock/unlock and/or start said motor vehicle.

The pairing method according to the invention may also include one or more of the following features, taken individually or in combination:

- said at least part of the authentication code is loaded by communication with a medium storing said at least part of the authentication code;
- the medium is the vehicle;
- the medium is a locking/unlocking and/or starting key;
- the medium is a remote server;
- at least part of the authentication code is loaded from one of the media in the set comprising a vehicle, a remote server and an existing locking/unlocking and/or starting key, and another part of said code is loaded from a different medium in the set comprising a vehicle, a remote server and an existing locking/unlocking and/or starting key;
- the mobile telephone receives at least part of the authentication code by near field communication;
- the mobile telephone receives at least part of the authentication code by mobile telephony communication;
- it includes the following steps:
  - the mobile telephone receives a decryption key to decrypt said at least one part of the encrypted authentication code,
  - the mobile telephone is brought close to said medium to receive said at least part of the encrypted authentication code by communication, and
  - the mobile telephone decrypts the encrypted authentication code using the decryption key and records said at least one part of the encrypted authentication code that has been decrypted;
- the decryption key is entered into the mobile telephone;
- the mobile telephone recovers the decryption key from the GSM network;
- said at least one part of the encrypted authentication code is encrypted using symmetrical cryptography;
- said at least one part of the encrypted authentication code is encrypted using asymmetrical public-private-key cryptography;
- said at least one part of the encrypted authentication code is encrypted using the Diffie-Hellman protocol;
- the ability of the mobile phone to lock/unlock and/or start the motor vehicle is revoked when the motor vehicle again authenticates the locking/unlocking and/or starting key;
- the ability of the mobile phone to lock/unlock and/or start the motor vehicle is revoked by switching a switch on the locking/unlocking and/or starting key;
- the ability of the mobile telephone to lock/unlock and/or start the motor vehicle is revoked by selecting an option from a menu of the computer on board the motor vehicle;
- the vehicle has a memory storing a primary code and a derivation algorithm able to produce a code derived from said primary code, and the vehicle is able to identify a mobile telephone as including a derived code different from a currently active derived code, and to revoke the derived code currently active when a telephone is identified;
- the mobile telephone is configured to send to the vehicle a datum indicating an order of appearance of the successive authentication codes, and the vehicle is configured not to authorize activation of an authentication code unless the order datum indicates an increment of said successive appearance order in relation to the order datum sent during authentication with the preceding authentication code.

The invention also concerns a motor vehicle starting and/or locking/unlocking set comprising:
- a motor vehicle starting and/or locking/unlocking key comprising:
  - a first communication interface configured to communicate using an NFC protocol,
  - a first memory containing an encrypted authentication code,
- a mobile telephone comprising:
  - a second communication interface configured to communicate using an NFC protocol,
  - a second memory,
  - a control unit configured to:
    - receive a decryption key,
    - receive the encrypted authentication code from the locking/unlocking and/or starting key by means of the first and second communication interfaces,
    - decrypt the authentication code using the decryption key and store the decrypted authentication code in the second memory,
    - communicate with the motor vehicle by means of the second communication interface to unlock said motor vehicle using said authentication code.

The invention also concerns a pairing application that can be downloaded to a mobile telephone, characterized in that it configures a mobile telephone to receive an authentication code required to unlock the motor vehicle using near field communication with a key for locking/unlocking and/or starting said motor vehicle and for locking/unlocking said motor vehicle using near field communication on the basis of said authentication code.

Figure 2:
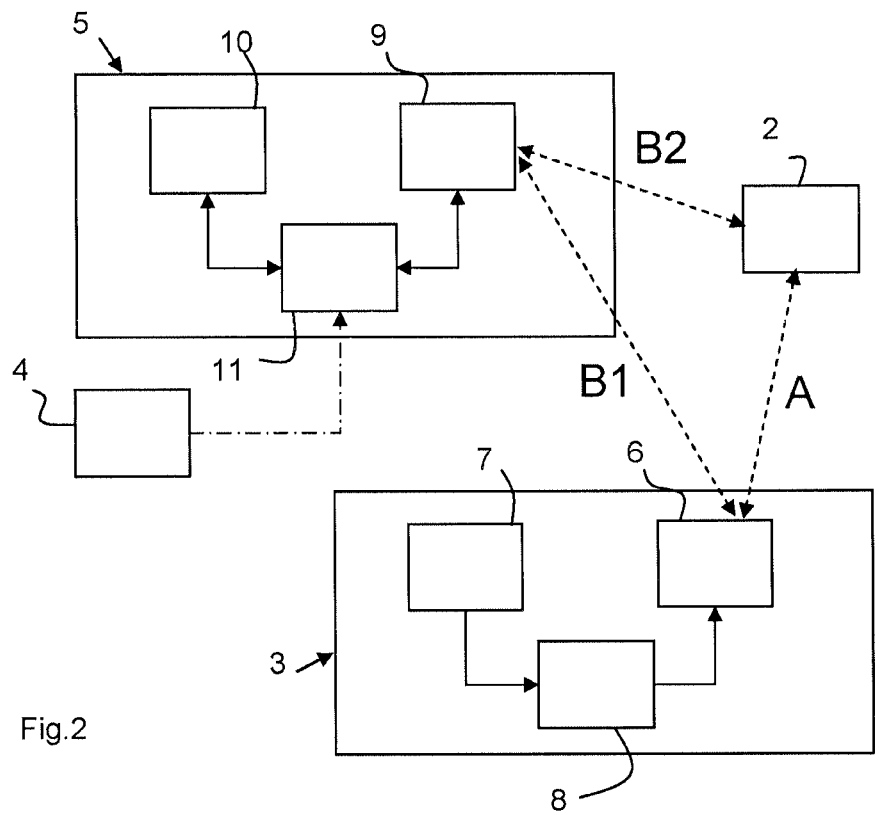
Figure 3:
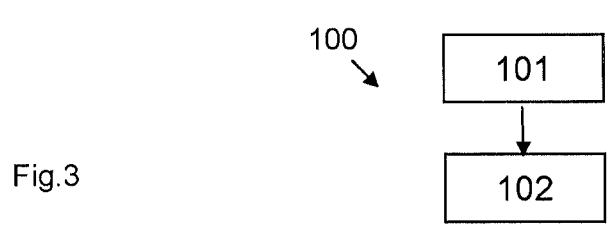

Other advantages and features are included in the description of the invention given by way of example, and in the attached figures in which:

FIG. 1 is a schematic view of a motor vehicle starting and/or locking/unlocking set, FIG. 2 is a schematic view of elements of the set in FIG. 1, and FIG. 3 is a flow chart of the steps of a pairing method.

In these figures, identical elements bear the same reference numbers.

FIG. 1 shows a locking/unlocking and/or starting set of a motor vehicle 2. The set 1 includes a locking/unlocking and/or starting key 3 of the motor vehicle 2, a decryption key medium 4 and a mobile telephone 5.

The motor-vehicle 2 and the locking/unlocking and/or starting key 3 are mutually authenticated by secret-key (or symmetrical) cryptography determining an authentication code when pairing is performed in factory or at the dealership. The locking/unlocking and/or starting key 3 includes a communication interface 6 configured to communicate using the NFC protocol. The key may also have a metal insert having a unique locking/unlocking pattern associated to a lock of the vehicle.

The unlocking/locking and/or starting key 3 is then configured to lock/unlock the motor vehicle contactlessly ("remote keyless entry", RKE), such as the locking/unlocking of the centralized locking system of the vehicle by simply bringing the key 3 close to the vehicle 2 to communicate the authentication code using the NFC protocol.

The near field communication (NFC) protocol is a short-range wireless link of a few centimeters that uses a data-exchange protocol based on very short range radio frequencies. It represents an extension of radio identification techniques that are based on ISO/IEC standard 14443 and enable communication between peripherals in peer-to-peer mode. The NFC protocol is based on inductive coupling and charge modulation in the slave device.

Unlike other radio-identification techniques or Bluetooth, which have a range of around 10 meters, the NFC technique can only be used over very short distances, several centimeters. It involves a deliberate action by the user and cannot therefore normally be used without the user knowing, thereby providing a guarantee of security for sensitive transactions such as locking/unlocking and/or starting a vehicle.

NFC technology is currently being developed by an industry association known as the NFC Forum. NFC technology is derived from radio frequency identification (RFID) technology and uses NFC processors or components having several operating modes, in particular a read mode and a card emulation mode.

In read mode, an NFC processor works like a conventional RFID reader to obtain read or write access to an RFID chip. The NFC processor emits a magnetic field, sends data by amplitude modulation of the magnetic field and receives data by charge modulation and inductive coupling. This mode is also known as active mode, since the NFC processor is emitting a magnetic field in this mode.

In the emulation mode, an NFC processor works passively, like a transponder, to dialogue with another reader and to be seen by the other reader as an RFID chip. The processor does not emit a magnetic field, receives signals by demodulating a magnetic field emitted by the other reader and sends data by modulating the impedance of the antenna circuit thereof (charge modulation). This mode is also known as passive mode, since the NFC processor is not emitting a magnetic field in this mode.

Other communication modes can be implemented, in particular a "device" mode in which a component needs to be paired with another NFC processor in the same operating mode, each NFC processor being placed alternatively in a passive state (emitting no field) to receive data and in an active state (emitting field) to send data.

In these three operating modes, an NFC processor can implement several contactless communication protocols, such as ISO 14443-A, ISO 14443-B or ISO 15693. Each protocol sets an emission frequency for the magnetic field, a method for modulating the amplitude of the magnetic field to send the data in active mode, and a method for modulating the charge by inductive coupling to send data in passive mode.

The NFC protocol is defined by several standards:
NFCIP-1 (ISO/IEC 18092) defines the communication protocol and interface between two NFC peripherals;
ISO/IEC 14443-1 to ISO/IEC 14443-4 define communication with the contactless integrated circuits;
NFC Data Exchange Format (NDEF) defines the logical data exchange format.

Near field communication generally has the following features:
Communication rates: 106, 212, 424 or 848 Kbits/s;
Frequency range: 13.56 MHz;
Communication distance: about 10 cm;
Communication mode: half-duplex or full-duplex;

According to a first embodiment, the authentication code is encrypted using asymmetrical cryptography and stored in a memory 7 of the locking/unlocking and/or starting key 3 (FIG. 2).

The locking/unlocking and/or starting key 3 also includes a processing unit 8. The processing unit 8, such as a microcontroller, is configured to communicate with the motor vehicle 2 via this communication interface 6 to unlock the motor vehicle 2 on the basis of the encrypted authentication code (double arrow A in FIGS. 1 and 2). The key 3 therefore forms, in a known manner, an electronic identifier of the user, enabling the authentication thereof to enable the vehicle doors to be locked/unlocked, the passenger compartment of the vehicle to be accessed and/or said vehicle to be started. Once he has entered the passenger compartment of the vehicle, the user can place the key 3 in a slot of an NFC reader of the vehicle, typically arranged on the dashboard. Inserting the key 3 into this slot enables the vehicle to be started. Starting the engine can for example be initiated by pressing a button on the dashboard.

The mobile telephone 5 ("smart phone") includes a second communication interface 9 configured to communicate using the NFC protocol, a second memory 10 and a control unit 11.

The control unit 11, such as a microcontroller, is configured to enter and store the decryption key of the medium 4 in the memory 10.

The decryption key is for example read by the user on the medium 4 then entered into the mobile telephone 5 via an input interface, such as the keypad. The second memory 10 is for example the SIM card of the mobile telephone 5. This enables the decryption key to be recovered from the GSM network.

The control unit 11 is also configured to receive the encrypted authentication code of the locking/unlocking and/or starting key 3 via the first and second communication interfaces 6, 9, to decrypt it using the decryption key, then to store the decrypted authentication code in the second memory 10.

Thus, the mobile telephone 5 can be paired with a motor vehicle, said paired mobile telephone being used to lock/unlock and/or start said motor vehicle by configuring the mobile telephone 5 to receive an authentication code required to lock/unlock and/or start the motor vehicle, using near field communication of a motor vehicle starting and/or locking/unlocking key 3 (double arrow B1 in FIGS. 1 and 2).

The control unit 11 is also configured to communicate with the motor vehicle 2 via the second communication interface 9 to lock/unlock and/or start the motor vehicle 2 on the basis of the authentication code (double arrow B2 in FIGS. 1 and 2).

According to the first embodiment in which the authentication code is encrypted using public/private key asymmetrical cryptography, the second memory 10 of the mobile telephone 5 contains a public key and the second control unit 9 is configured to:
  enter and/or store a private decryption key of the authentication code in the second memory,
  use the public key to read the encrypted authentication code of the locking/unlocking and/or starting key 3,
  decrypt the authentication code using the private key.

According to a second embodiment, the authentication code of the locking/unlocking and/or starting key received by the mobile telephone is encrypted using the Diffie-Hellman protocol. The second memory 10 of the mobile telephone 5 then contains the Diffie-Hellman data, for example obtained from the medium 4, and the second control unit 11 is configured to:
  generate and exchange Diffie-Hellman values with the locking/unlocking and/or starting key 3 to determine a secret decryption key of the encrypted authentication code, using the Diffie-Hellman data,
  decrypt the authentication code with the secret decryption key.

According to a third embodiment, the authentication code is encrypted using symmetrical cryptography.

The main steps of the pairing method 100 of the mobile telephone 5 and the motor-vehicle 2 are described below (FIG. 3).

In a first step 101, a decryption key is entered into the mobile telephone 5 to decrypt the authentication code. To do this, the user can launch an application for configuring the mobile telephone 5, for example to enter the decryption key or to enable the mobile telephone to recover the decryption key from the GSM network.

In a second step 102, after or before the first step 101, the mobile telephone 5 is brought towards the locking/unlocking and/or starting key 3 to receive the encrypted authentication code by near field communication (double arrow B1).

The mobile telephone 5 is then able to unlock the motor vehicle 2 (double arrow B2).

The vehicle 2 can either be locked automatically when the user moves away from the vehicle, or by pressing a switch on the locking/unlocking and/or starting key 3, causing a locking command to be sent to a receiver of the vehicle using another antenna circuit.

Use of the mobile telephone 5 as a virtual key enabling the motor vehicle 2 to be locked/unlocked may be revoked by switching a switch or by the combined switching of several switches of the locking/unlocking and/or starting key 3.

The user may also be able to revoke the ability of the mobile telephone 5 to lock/unlock the motor vehicle 2 by selecting an option from a menu of the computer on board the motor vehicle.

Alternatively, the ability of the mobile telephone 5 to unlock the motor vehicle may be revoked if the motor vehicle 2 again authenticates the locking/unlocking and/or starting key 3, i.e. if the locking/unlocking and/or starting key 3 is brought back towards the motor vehicle 2 (double arrow A).

According to another example, the locking/unlocking key is revoked using a series of keys pre-recorded in the vehicle and loaded into different successive mobile telephones from a medium, whether this be the vehicle or another medium for such authentication codes, following the initial order of this series of predetermined codes.

Thus, when an authentication code is loaded onto a new mobile telephone and this mobile telephone is used with this authentication code, the vehicle identifies implementation of this new code and infers the obsolescence of the code previously used. The telephone previously loaded with an authentication code is consequently neutralized.

In another embodiment, the vehicle has a memory storing a primary code and a derivation algorithm able to produce a code derived from this primary code, and the vehicle is able to identify a mobile telephone as including a derived code different from a currently active derived code, and to revoke the derived code currently active when such a telephone is identified.

For this purpose, a telephone loaded with a new authentication code, derived from the original code, begins by sending the vehicle the differentiation data comprising an identification number of the telephone, as well as a date and a time. This data has already been used to establish the derived key, for example in a remote server. The vehicle receiving this differentiation data generates the value of the derived key in the vehicle. Finally, the vehicle sends a random value to the telephone with the derived key, which is thus present on both sides, i.e. in the vehicle and in the mobile telephone. The mobile telephone processes this random value to produce a signature using the derived key. The telephone then sends this signature to the vehicle that, having itself calculated this signature using the same known algorithm, checks that the two signatures are identical and unlocks or starts the vehicle if they are.

The telephone is preferably configured to send to the vehicle a datum indicating an order of appearance of the successive authentication codes, and the vehicle is configured not to authorize activation of an authentication code unless the order datum indicates an increment of said successive appearance order in relation to the order datum sent during authentication with the preceding authentication code.

The datum indicating the order of appearance is for example sent simultaneously with the differentiation data previously described to include an identification number of the telephone and a date and time, or even an absolute time.

Alternatively, the datum indicating the order of appearance is itself a time value or time gap, expressed for example in minutes. The datum indicating the order of appearance is for example a numerical value between 1 and 100, encoded in a field of 7 bits for example placed in the header of a message containing the various data.

This prevents an authentication code intended to be replaced by a new code from being reactivated in the vehicle to the detriment of a currently active code.

This enables NFC technology to be used to pair a mobile telephone 5 with a motor vehicle 2 using one of the keys of the motor vehicle 2 by transferring data encrypted for example using public/private key asymmetrical cryptography, symmetrical cryptography or the Diffie-Hellman protocol. The mobile telephone 5 then forms a virtual key enabling authentication of the user to enable the doors of the vehicle to be locked/unlocked, the passenger compartment of the vehicle to be accessed and/or the vehicle to be started.

In the embodiment described above, an authentication code or at least one part thereof is loaded from a medium initially storing this code, which in this case is an existing identifier of the vehicle.

The method for loading authentication codes onto the telephone described above may alternatively be implemented in the manner described below.

In this embodiment, a web server is made available to the user, providing this latter with an interface enabling him to enter personal data including in particular the identification data of his vehicle. The server stores a database in which a vehicle series is saved for this purpose, said database being used to identify the vehicle indicated by the user.

In a second step, the server requires the user to enter at least one identification datum of the telephone to be loaded with the authentication data, in particular the telephone number of this latter.

Once this data, which may be complemented by requesting a predetermined password to authenticate the user of this web server, has been obtained, the server sends the secret data required to lock/unlock and/or start the vehicle to the user's telephone.

This method allows a user A to request authentication data to be loaded onto the telephone of a user B, for example someone identified as an occasional or one-off user of the vehicle.

In this embodiment, an authentication code is loaded from a medium initially storing this code, in this case the support being a remote server.

In an alternative embodiment, the direct loading onto the telephone by GSM, in the example above typically by SMS, may be replaced by an Internet download, in particular by coupling the telephone with a personal computer connected to the Internet, the telephone and the computer being for example connected by Bluetooth or any other link, such as USB.

In an embodiment implementing a higher degree of security, authentication of the user wishing to load the authentication code onto the telephone is more stringent, involving in this case providing evidence to the server of physical possession of the initial locking/unlocking and/or starting key of the vehicle or of a telephone itself already loaded with the authentication code.

In this embodiment, when the user is connected to the web download server, the user brings the vehicle starting and/or locking/unlocking key close to the telephone used to connect to the web server, i.e. telephone with a web browser, in order to transmit secret data stored in the key to the web server via the telephone thus connected to the vehicle starting and/or locking/unlocking key. This connection is for example effected by NFC link.

In order to secure the launching of the authentication code download, in addition to or independently of the key possession test described, the authentication code required on the mobile telephone to lock/unlock and/or start the vehicle may alternatively comprise at least two elements. One of these elements is loaded remotely from the web server as described previously, and the other is not designed to be loaded from the web server but is transferred by a direct link between the pre-existing key and the telephone onto which it is loaded.

Thus, to use a telephone to unlock the vehicle, the user is required to request a download of one of the elements of the authentication code from the web server, and to bring the identifier and the telephone physically close together. This dual loading step prevents a fraudulent user from loading the authentication code onto his telephone having first obtained the identification data of the vehicle and the password to access the server (where applicable), and it also prevents a fraudulent user from loading the authentication code onto his telephone by simply being close to the key temporarily entrusted to him.

In this embodiment, an element making up the authentication code is loaded from a medium storing this element, this medium being a remote server, and another element making up the authentication code is loaded from a physical key held by the user, which is also a medium in which this second element is pre-stored.

In another embodiment, the authentication data required to unlock the vehicle is loaded onto the telephone by bringing this latter close to a device on board the vehicle that is able to transfer this data to a telephone.

This involves a vehicle fitted with a pairing module including a communication module able to establish a first exchange with a telephone, in particular by near field communication, and, in a second step, potentially subject to a password expected by this device being entered, in particular entered via the interface of the telephone, to transfer the authentication data to the telephone using the same near field communication.

Communication with the equipment on the vehicle enabling the authentication data to be loaded onto the telephone may alternatively be effected by any other means of communication, such as Bluetooth, GSM, or a two-way exchange in which a request is made at low frequency and the response provided at radio frequency.

In this embodiment, the medium initially storing the authentication code or a part thereof is the vehicle itself.

In an easy-to-implement embodiment, the authentication code or a part thereof is loaded onto the telephone using the keypad/screen interface of this latter, the user having first obtained the authentication code for example by mail or when purchasing the vehicle.

In the different embodiments described, it is possible that the mobile phone thus paired works like a locking/unlocking and/or starting device on the basis of a communication using one or more of the communication methods including NFC, Bluetooth or a two-way exchange in which a request is sent at low frequency and the response at radio frequency. For example, the vehicle could be accessed using the telephone paired by near field communication and the vehicle started using Bluetooth communication.

The invention claimed is:

1. A method, comprising:
    pairing a mobile telephone with a motor vehicle, the paired mobile telephone being used to lock/unlock and/or start the motor;
    loading the mobile telephone with a part of an authentication code required to lock/unlock and/or start the motor vehicle received from a first medium that is one selected from the group consisting of: a vehicle, a remote server, and an existing locking/unlocking and/or starting key;

loading the mobile telephone with another part of the authentication code received from a second medium different from the first medium, the second medium being one selected from the group consisting of: the vehicle, the remote server, and the existing locking/unlocking and/or starting key;

operating the lock/unlock and/or start of the motor vehicle based on a communication exchange between the mobile telephone and the motor vehicle and a verification of the part of the authentication code and the another part of the authentication code, where the part of the authentication code and the another part of the authentication code are exchanged between the mobile telephone and the motor vehicle; and performing the communication exchange between the mobile telephone and the motor vehicle by one selected from the group consisting of a bluetooth protocol and a near field communication protocol.

2. The pairing method as claimed in claim 1, further comprising: receiving at least one part of the authentication code by near field communication with the mobile telephone.

3. The pairing method as claimed in claim 1, further comprising: receiving, with the mobile telephone, at least one part of the authentication code by mobile telephony communication.

4. The pairing method as claimed in claim 1, further comprising:
receiving, by the mobile telephone, a decryption key to decrypt at least one part of the authentication code;
bringing the mobile telephone close to the medium to receive the at least one part of the authentication code by communication; and
decrypting, by the mobile telephone the authentication code using the decryption key and records the at least one part of the authentication code that has been decrypted.

5. The pairing method as claimed in claim 4, further comprising: entering the decryption key into the mobile telephone.

6. The pairing method as claimed in claim 4, further comprising: recovering, by the mobile telephone, the decryption key from the GSM network.

7. The pairing method as claimed in claim 4, further comprising: encrypting the at least one part of the authentication code using symmetrical cryptography.

8. The pairing method as claimed in claim 4, further comprising: encrypting the at least one part of the authentication code using asymmetrical public-/private-key cryptography.

9. The pairing method as claimed in claim 4, further comprising: encrypting the at least one part of the authentication code using the Diffie-Hellman protocol.

10. The pairing method as claimed in claim 1, further comprising: revoking the ability of the mobile phone to lock/unlock and/or start the motor vehicle when the motor vehicle again authenticates the locking/unlocking and/or starting key.

11. The pairing method as claimed in claim 1, further comprising: revoking the ability of the mobile phone to lock/unlock and/or start the motor vehicle by switching a switch on the locking/unlocking and/or starting key.

12. The pairing method as claimed in claim 1, further comprising: revoking the ability of the mobile telephone to lock/unlock and/or start the motor vehicle by selecting an option from a menu of the computer on board the motor vehicle.

13. The pairing method as claimed in claim 1, further comprising: producing a code derived from a primary code by the motor vehicle that further includes a memory storing the primary code and a derivation algorithm, and identifying, by the motor vehicle, a mobile telephone as including a derived code different from a currently active derived code, and to revoke the derived code currently active when a telephone is identified.

14. The pairing method as claimed in claim 13, further comprising: sending, by the mobile telephone, to the vehicle a datum indicating an order of appearance of the successive authentication codes, and in that the vehicle is configured not to authorize activation of an authentication code unless the order datum indicates an increment of the successive appearance order in relation to the order datum sent during authentication with the preceding authentication code.

15. A motor vehicle locking/unlocking set comprising:
a motor vehicle locking/unlocking key comprising:
a first communication interface that communicates using a near field communication (NFC) protocol,
a first memory containing an encrypted authentication code; and
a mobile telephone comprising:
a second communication interface that communicates using the NFC protocol,
a second memory, and
a microcontroller that:
receives a decryption key,
receives the encrypted authentication code in two parts, a part of an authentication code and another part of the authentication code from the locking/unlocking key and the motor vehicle by two different means of the first and second communication interfaces,
decrypts the encrypted authentication code using the decryption key and stores the decrypted authentication code in the second memory, and
communicates with the motor vehicle by means of the second communication interface to unlock the motor vehicle using the two parts of the authentication code, and a verification of the part of the authentication code and the another part of the authentication code, that are exchanged between the mobile telephone and the motor vehicle.

16. A method comprising:
downloading a pairing application to a mobile telephone; and
receiving, by the pairing application downloaded to the mobile telephone, a first part and a second part of an authentication code required to lock/unlock a motor vehicle from two different sources selected from the group consisting of: a vehicle, a remote server, and an existing locking/unlocking and/or starting key; and
locking/unlocking the motor vehicle, by the pairing application, using near field communication on a basis of exchanging the first part and the second part of the authentication code with the motor vehicle and a verifying the first part and the second part of an authentication code the authentication code.

* * * * *